(12) United States Patent
Graham

(10) Patent No.: US 9,249,927 B2
(45) Date of Patent: Feb. 2, 2016

(54) SUPPORT FOR PLANAR OR TABLET COMPUTING DEVICE

(76) Inventor: Bernard John Graham, Corbeil (CA)

( * ) Notice: Subject to any disclaimer, the term of this patent is extended or adjusted under 35 U.S.C. 154(b) by 152 days.

(21) Appl. No.: 13/823,486

(22) PCT Filed: Apr. 1, 2011

(86) PCT No.: PCT/IB2011/001171
§ 371 (c)(1),
(2), (4) Date: May 28, 2013

(87) PCT Pub. No.: WO2012/042317
PCT Pub. Date: Apr. 5, 2012

(65) Prior Publication Data
US 2013/0299652 A1 Nov. 14, 2013

Related U.S. Application Data

(60) Provisional application No. 61/387,258, filed on Sep. 28, 2010.

(51) Int. Cl.
*F16M 13/02* (2006.01)
*F16M 11/04* (2006.01)
*F16M 11/14* (2006.01)
*F16M 13/04* (2006.01)

(52) U.S. Cl.
CPC ........... *F16M 13/022* (2013.01); *F16M 11/041* (2013.01); *F16M 11/14* (2013.01); *F16M 13/04* (2013.01); *F16M 2200/022* (2013.01); *F16M 2200/08* (2013.01)

(58) Field of Classification Search
CPC ... F16M 13/04; F16M 2200/08; F16M 11/14; F16M 11/2078; F16M 11/00; F16M 11/041; F16M 2200/022; A47B 23/002; G06F 1/163

USPC ......... 248/688, 181.1, 181.2, 288.31, 288.51, 248/133, 136, 139, 346.03, 346.07; 108/43; D14/447

See application file for complete search history.

(56) References Cited

U.S. PATENT DOCUMENTS

| | | | | |
|---|---|---|---|---|
| 5,937,765 A | * | 8/1999 | Stirling | 108/43 |
| 6,315,426 B1 | * | 11/2001 | Buller, Jr. | 362/108 |
| 6,352,233 B1 | * | 3/2002 | Barberich | 248/676 |
| 6,360,928 B1 | * | 3/2002 | Russo | 224/218 |
| 6,457,591 B1 | * | 10/2002 | Lee | 211/41.2 |
| 6,496,360 B1 | * | 12/2002 | Cordes et al. | 361/679.09 |
| 7,334,711 B1 | * | 2/2008 | Winters | 224/217 |
| D626,559 S | * | 11/2010 | Green | D14/447 |
| 7,942,293 B2 | * | 5/2011 | Lawrence et al. | 224/218 |

(Continued)

*Primary Examiner* — Ingrid M Weinhold
(74) *Attorney, Agent, or Firm* — Clark Hill PLC; Paul D. Bangor, Jr.

(57) ABSTRACT

A stand or support for a planar or tablet computing device, comprising: a base, the base may define a slot; wherein the slot is of sufficient length and width, which may be adjustable, for receiving a side of the planar or tablet computing device for supporting the same in a vertical position or at angle with respect to vertical; a ball-shaped shaft support removably disposed within a socket defined by the base; a support shaft removably secured to the ball-shaped shaft support; and a support plate for supporting the planar or tablet computing device; wherein the support plate is removably attachable to the support shaft and the position of the support plate may be adjusted so that a side or upper surface of the support plate contacts the planar or tablet computing device disposed in the slot to provide additional support for the planar or tablet computing device.

17 Claims, 9 Drawing Sheets

(56) References Cited

U.S. PATENT DOCUMENTS

| | | | |
|---|---|---|---|
| 8,333,353 B1* | 12/2012 | Silverman et al. | 248/205.6 |
| D704,201 S * | 5/2014 | Shubin, Sr. | D14/447 |
| 2003/0071184 A1* | 4/2003 | Parkinson | 248/346.01 |
| 2009/0152418 A1* | 6/2009 | Bury | 248/205.3 |
| 2009/0229497 A1* | 9/2009 | Persico et al. | 108/43 |
| 2009/0250570 A1* | 10/2009 | Corn et al. | 248/183.1 |
| 2010/0193649 A1* | 8/2010 | Wiegers | 248/183.1 |
| 2010/0320341 A1* | 12/2010 | Baumann et al. | 248/206.2 |
| 2011/0297566 A1* | 12/2011 | Gallagher et al. | 206/320 |
| 2012/0024918 A1* | 2/2012 | DeCamp et al. | 224/267 |
| 2013/0187020 A1* | 7/2013 | Trotsky | 248/309.3 |
| 2013/0277529 A1* | 10/2013 | Bolliger | 248/676 |

* cited by examiner

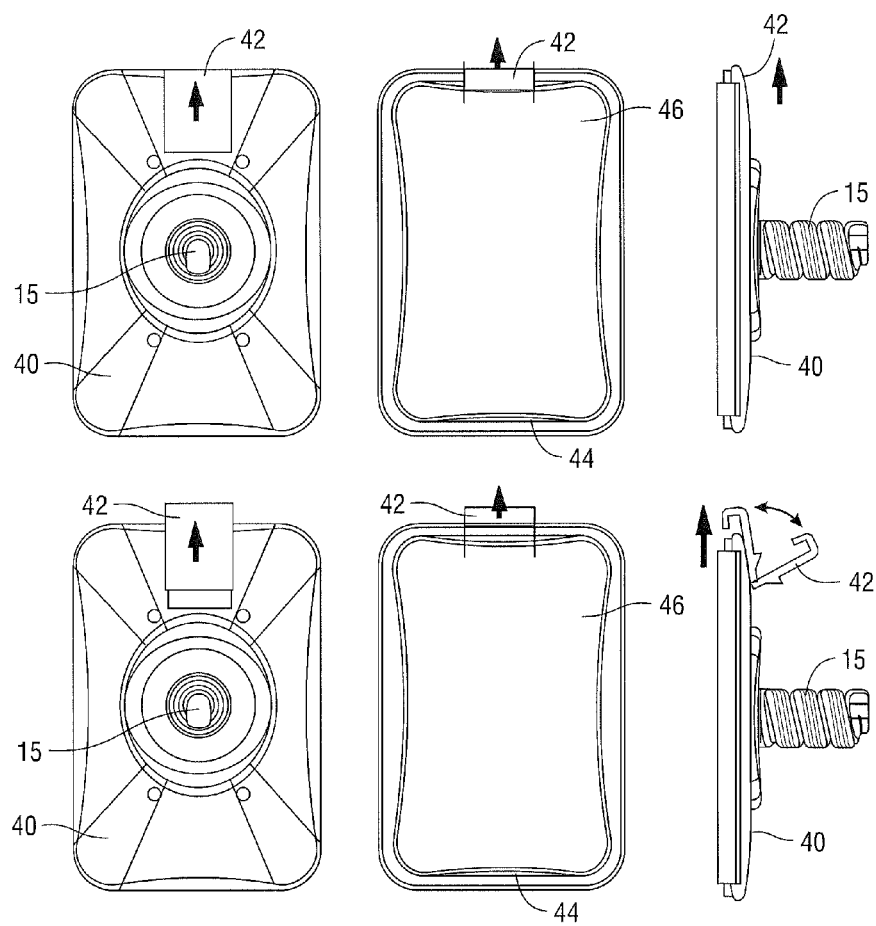
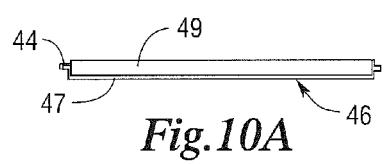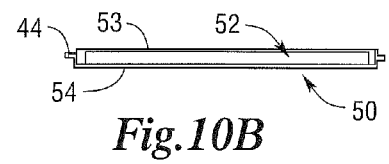
Fig.9
Fig.10A  Fig.10B

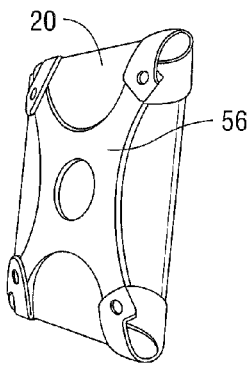
*Fig.11*
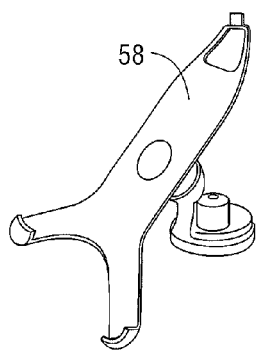
*Fig.12*
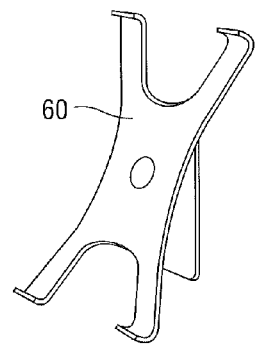
*Fig.13*
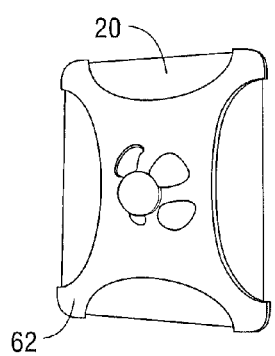
*Fig.14*
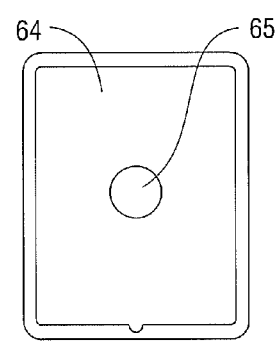
*Fig.15*
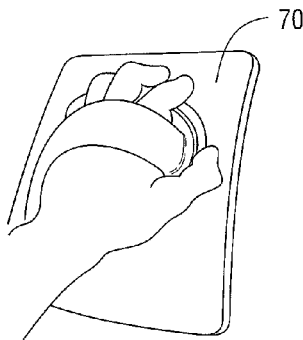
*Fig.18*
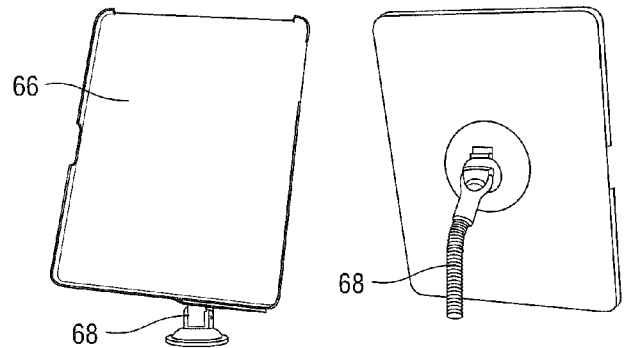
*Fig.16*  *Fig.17*

SUPPORT FOR PLANAR OR TABLET COMPUTING DEVICE

CROSS-REFERENCE TO RELATED APPLICATIONS

The present application claims benefit and priority from U.S. provisional application 61/387,258 entitled "Stand and/or Support for Planar or Tablet Computing Device," filed on Sep. 28, 2010, the disclosure of which is hereby incorporated by reference herein in its entirety for all purposes.

FIELD OF THE INVENTION

This invention relates generally to apparatus and methods for supporting planar or tablet computing devices such as iPads and other tablet computers and iPhones and other smart cellular telephones and the like.

BACKGROUND OF THE INVENTION

Conventional designs and constructions for supporting planar or tablet computing devices all have drawbacks, especially that they are not very versatile in function. While they may be able to support a tablet computer in one orientation or for one purpose, such as orienting the tablet computer in a comfortable position for typing or word processing, they are limited in such functions.

Accordingly, it would be desirable to provide a stand or support for a planar or tablet computing device which is multi-functional and portable.

In addition, it would be desirable to provide a stand or support for a planar or tablet computing device which may be used on a table or other surface, as well as being removably attachable to a user's body.

Further, it would be desirable to provide a stand or support for a planar or tablet computing device which is specially designed to enhance the gaming capabilities of such computing device.

In addition, it would be desirable to provide a stand or support which allows for numerous different orientations of a planar or tablet computing device.

These and other advantages of the invention will be appreciated by reference to the detailed description of the preferred embodiment(s) that follow.

BRIEF SUMMARY OF THE INVENTION

In a first aspect, the present invention comprises a stand or support for a planar or tablet computing device, comprising: a base; a ball-shaped shaft support removably disposed within a socket defined by the base; a support shaft removably secured to the ball-shaped shaft support; and a support plate for supporting the planar or tablet computing device; wherein the support plate is removably attachable to the support shaft.

In accordance with another aspect of the stand or support for a planar or tablet computing device, the base has a convex upper surface and a concave underside.

In yet another aspect of the stand or support, the underside of the base and/or a perimeter of the base comprises a non-slip material, an adhesive material or a temporary fixation material.

In yet an additional aspect, the stand or support further comprises means for removably attaching the base to a limb of a user or other generally cylindrical object.

In yet another aspect of the stand or support, the ball-shaped shaft support is rotatably disposed within the socket.

In another aspect of the stand or support, the ball-shaped shaft support is removably retained within the socket by a threaded retainer ring that can be tightened onto a cylindrical column defined by the base; wherein the cylindrical column defines the socket and has a threaded outer surface on which the threaded retainer ring may be removably secured.

In yet a further aspect of the stand or support, the retainer ring may be tightened onto the cylindrical column to varying degrees to allow for rotational movement of the ball-shaped shaft support within the socket and also for temporary immobilization of the ball-shaped shaft support within the socket.

In yet another aspect of the stand or support, the support plate comprises a non-slip upper surface. In another aspect of the stand or support, the support plate comprises a tacky upper surface.

In yet an additional aspect, the stand or support further comprises a non-slip cover for covering the tacky upper surface.

In yet another aspect of the stand or support, the support plate comprises an upper surface comprising an adhesive material, a tacky material or a temporary fixation material.

In yet a further aspect of the stand or support, the support plate comprises an upper surface comprising a polyurethane material.

In yet another aspect of the stand or support, the support plate comprises an upper surface comprising a thermoplastic elastomer, a silicone, a rubber, an acrylic, an acrylic foam or an acrylic adhesive.

In yet an additional aspect, the stand or support further comprises a suction cup disposed on the support plate; wherein the suction cup is used for removably attaching the planar or tablet computing device to the support plate.

In another aspect, the stand or support further comprises a hook and loop fastener for removably fastening the planar or tablet computing device to the support plate.

In yet another aspect of the stand or support, the base comprises a central body and first and second side members, wherein the central body defines the socket and each of the first and second side members articulates with the central body.

In another aspect of the stand or support, the each of the first and second side members may be folded underneath the central body.

In yet a further aspect of the stand or support, the support shaft comprises external threading and the ball-shaped shaft support comprises a generally spherical body and a cylindrical neck portion having a threaded bore for receiving the support shaft.

In an additional aspect of the stand or support, the base defines a slot; wherein the slot is of sufficient length and width for receiving a side of the planar or tablet computing device for supporting the same in a vertical position or at angle with respect to vertical. In a further aspect of the stand or support, the width of the slot is adjustable.

In yet another aspect of the stand or support, the base and the first and second side members collectively define a slot.

In another aspect of the stand or support, the slot is of sufficient length and width for receiving a side of the planar or tablet computing device for supporting the same in a vertical position or at angle with respect to vertical. In a further aspect of the stand or support, the width of the slot is adjustable.

In another aspect of the stand or support, the slot has an open top, an open bottom and one open side, in-whole or in-part.

In another aspect, the stand or support further comprises means for removably attaching the planar or tablet computing device to the support plate.

In another aspect, the present invention comprises a stand or support for a planar or tablet computing device, comprising: a base; a slot defined by the base, wherein the slot is of sufficient length and width for receiving a side of the planar or tablet computing device for supporting the same in a vertical position or at angle with respect to vertical; and a ridge slidably disposed on the base, wherein the planar or tablet computing device may be supported against the ridge when the planar or tablet computing device is disposed in the slot.

In yet a further aspect, the present invention comprises a stand or support for a planar or tablet computing device, comprising: a base; and means for removably attaching the planar or tablet computing device to the base.

In yet another aspect, the present invention comprises a method for supporting a planar or tablet computing device, comprising: providing a stand or support for a planar or tablet computing device, comprising a base; a ball-shaped shaft support removably disposed within a socket defined by the base, a support shaft integral with or secured to the ball-shaped shaft support; and a support plate integral with or secured to the support shaft; wherein the base defines a slot and the slot is of sufficient length and width for receiving a side of the planar or tablet computing device; wherein the ball-shaped shaft support is removably retained within the socket by a threaded retainer ring that can be tightened onto a cylindrical column defined by the base; and wherein the retainer ring may be tightened onto the cylindrical column to varying degrees to allow for rotational movement of the ball-shaped shaft support within the socket and also for temporary immobilization of the ball-shaped shaft support within the socket; inserting a side of the planar or tablet computing device into the slot; and adjusting the position of the support plate so that a side or upper surface of the support plate contacts the planar or tablet computing device disposed in the slot.

BRIEF DESCRIPTION OF THE SEVERAL VIEWS OF THE DRAWING

For the present disclosure to be easily understood and readily practiced, the present disclosure will now be described for purposes of illustration and not limitation in connection with the following figures, wherein:

FIG. 9 is a series of elevational views of a preferred embodiment of a support plate having a dual-sided support pad having a non-slip side and a hi-tack or adhesive side for use with the stand or support of the present invention;

FIG. 10A is a cross-sectional view a preferred embodiment of a dual-sided support pad having a non-slip side and a hi-tack or adhesive side for use with a stand or support of the present invention;

FIG. 10B is a cross-sectional view another preferred embodiment of a dual-sided support pad having a non-slip side and a hi-tack or adhesive side and an embedded magnet for use with a stand or support of the present invention;

FIG. 11 is a perspective view of a preferred embodiment of a harness useful as part of a means for removably attaching a planar or tablet computing device to a stand or support of the present invention;

FIG. 12 is a perspective view of a preferred embodiment of a bracket useful as part of a means for removably attaching a planar or tablet computing device to a stand or support of the present invention;

FIG. 13 is a perspective view of another preferred embodiment of a bracket useful as part of a means for removably attaching a planar or tablet computing device to a stand or support of the present invention;

FIG. 14 is a perspective view of another preferred embodiment of a harness useful as part of a means for removably attaching a planar or tablet computing device to a stand or support of the present invention;

FIG. 15 is a perspective view of a preferred embodiment of a cover with an aperture useful as part of a means for removably attaching a planar or tablet computing device to a stand or support of the present invention;

FIG. 16 is a front perspective view of a preferred embodiment of a cover or bracket with a support shaft useful as part of a means for removably attaching a planar or tablet computing device to a stand or support of the present invention;

FIG. 17 is a rear perspective view of the cover or bracket with a support shaft of FIG. 16;

FIG. 18 is a perspective view of another preferred embodiment of a cover or bracket useful as part of a means for removably attaching a planar or tablet computing device to a stand or support of the present invention.

DETAILED DESCRIPTION OF THE INVENTION

In the following detailed description, reference is made to the accompanying examples and figures that form a part hereof, and in which is shown, by way of illustration, specific embodiments in which the inventive subject matter may be practiced. These embodiments are described in sufficient detail to enable those skilled in the art to practice them, and it is to be understood that other embodiments may be utilized and that structural or logical changes may be made without departing from the scope of the inventive subject matter. Such embodiments of the inventive subject matter may be referred to, individually and/or collectively, herein by the term "invention" merely for convenience and without intending to voluntarily limit the scope of this application to any single invention or inventive concept if more than one is in fact disclosed.

The following description is, therefore, not to be taken in a limited sense, and the scope of the inventive subject matter is defined by the appended claims and their equivalents.

Figure 1:
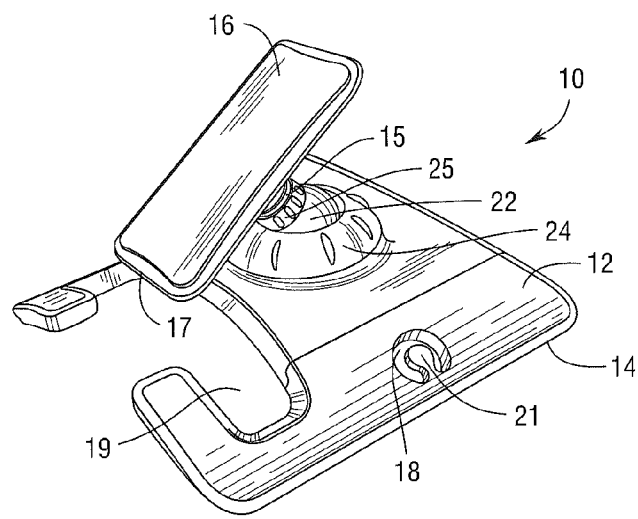
FIG. 1 is a perspective view of a stand or support for a planar or tablet computing device according to a preferred embodiment of the present invention.
Figure 3:
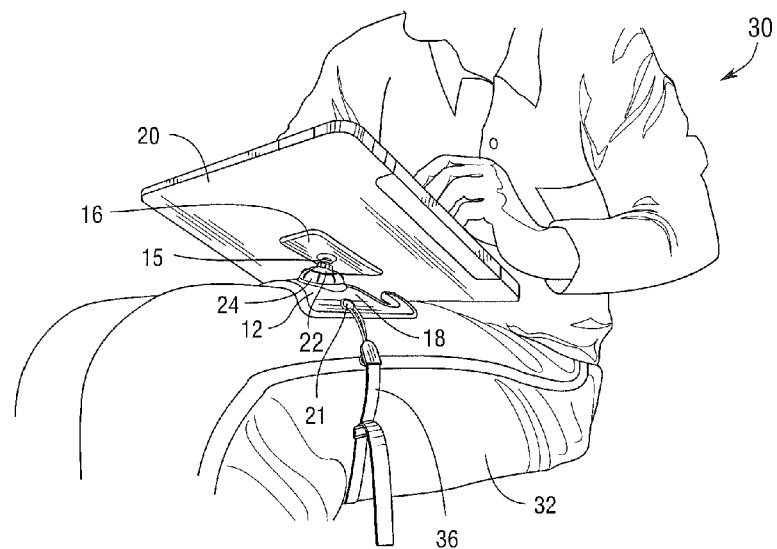
FIG. 3 is a perspective view showing the stand or support of FIG. 1 removably attached to a user of the planar or tablet computing device supported by the stand or support.

FIG. 1 illustrates a preferred embodiment of a stand or support 10 for a planar or tablet computing device 20 of the present invention comprising a base 12 having an outer perimeter 14 and defining slot 19. As shown in the figures, base 12 preferably has a convex upper surface 8 and a concave underside 9. The concave underside 9 preferably conforms to a substantially cylindrical article, such as a user's thigh 32, as shown in FIG. 3, to provide added support for the stand 10 and computing device 20 while in use. An optional tether strap 36 hooked onto tether prongs 21 in tether openings 18 defined by base 12 may be used to further secure stand 10 to the leg 32 of a user 30 as also shown in FIG. 3.

Preferably, perimeter 14 of base 12, including the perimeter 14 defining slot 19, as well as the underside 9 of base 12, all comprise a layer of non-slip or adhesive material thereon. As shown in the figures, base 12 defines an annular shoulder 11 surrounding a threaded cylindrical column 13 surrounding aperture 31 (see FIG. 5). Cylindrical column 13 defines a socket 38 which receives ball shaft support 22 having neck 25 and a bore (not shown) preferably extending completely through ball shaft support 22 and neck 25. Threaded support shaft 15 may be removably engaged to both the ball shaft support 22 and support plate 16. Both the perimeter 17 and upper surface of support plate 16 are preferably made from a non-slip, tacky, adhesive or temporary fixation material. A thin dust cover of non-slip sheet material preferably is used to cover the upper surface of support plate 16 when the latter is made from a hi-tack, adhesive or temporary fixation material to keep dust and dirt off of such hi-tack, adhesive or temporary fixation material layer to prolong the effective life thereof. Such dust cover would also provide a non-slip surface on which computing device could be disposed on when a less aggressive gripping surface is desired.

Threaded retainer ring 24 may be removably secured onto the threaded cylindrical column 13 and over annular shoulder 11 to retain ball shaft support 22 in socket 38. The degree to which retainer ring 24 is tightened onto the cylindrical column 13 will provide various amounts of rotational freedom of the ball shaft support 22 in socket 38. If the retainer ring 24 is only loosely tightened on cylindrical column 13, ball shaft support 22 will be able to rotate freely to position support plate 16, as well as the computing device 20 disposed thereon or supported thereby, in positions desired by user 30. Then, retainer ring 24 can be securely tightened onto cylindrical column 13 to temporarily immobilize the support plate 16, along with the computing device 20 disposed thereon or supported thereby, is such desired positions, such as the positions shown in FIGS. 2 and 3.

As used herein, non-slip materials preferably include polyurethane material and thermoplastic elastomer materials, and polyester films. Hi-tack and adhesive materials preferably include Regabond-S non-slip and temporary fixation material and cushion foam, silicone, rubber, acrylic, acrylic foam, micro-suction materials and/or acrylic adhesive materials. Base 12 and other components of stand 10 are preferably made from an acrylonitrile butadiene styrene (ABS) or other suitable material.

Figure 2:
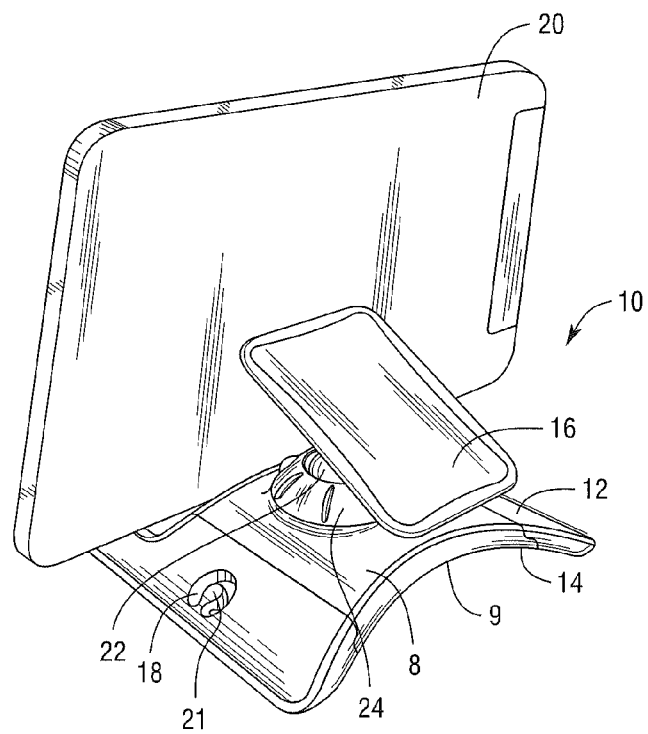
FIG. 2 is a perspective view of the stand or support of FIG. 1 showing a planar or tablet computing device supported for use thereon.

As further illustrated in FIG. 2, stand 10 may be used to hold a planar computing device 20, such as an iPad or iPhone, vertically (true 90°) or at an angle from vertical, in slot 19 with support plate 16 positioned such that its upper surface and/or perimeter 17 adds further support to the computing device 20. As shown in FIG. 2, the long side of the computing device 20 has been inserted into slot 19. However, if long enough so that computing device 20 would maintain a level orientation, the short side of computing device 20 may also be inserted into slot 19.

FIG. 3 shows stand 10 being used by user 30 wherein the concave underside 9 of stand 10 has been fitted over the leg 32 of user 30. An optional tether strap 36 hooked onto tether prongs 21 in tether openings 18 defined by base 12 may be used to further secure stand 10 to the leg 32 of user 30.

Figure 4A:
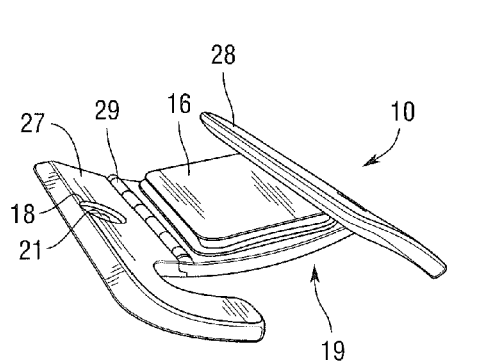
FIG. 4A is a perspective view showing the folding of the stand or support of FIG. 1 for stowage.
Figure 4B:
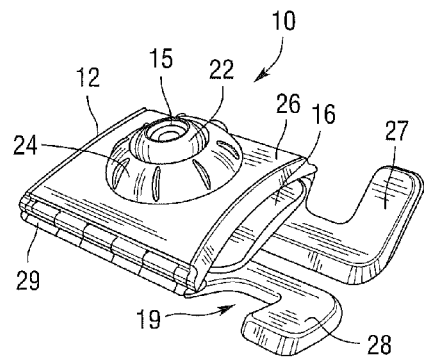
FIG. 4B is a perspective view showing the stand or support of FIG. 1 folded for stowage.

FIGS. 4A and 4B show stand 10 in a partially stowed and fully stowed configurations, respectively. FIG. 4 is a prospective view of the concave underside of base 12 showing hinges 29 that allow each of the right side member 27 and the left side member 28 to articulate or fold with respect to the central body 26 of base 12. As also shown, support plate 16 has been removed from the convex upper surface 8 of base 12 and has been removably installed against the concave underside 9 of base 12. This is accomplished by unscrewing support shaft 15 from ball shaft support 22, loosening retainer ring 24, and then screwing the threaded support shaft 15 with support plate 16 attached thereto into the central bore in the ball shaft support 22 from the concave underside 9 of base 12. Retainer ring 24 is then tightened onto cylindrical column 13 to bring support plate 16 as close as possible to the underside of base 12 whereupon side members 27 and 28 may be folded over support plate 16 to configure the stand 10 in its fully stowed position as shown in FIG. 4B. The tether strap 36 may be wrapped around the stowed stand 10, preferably around the side members 27 and 28 where they define slot 19.

Figure 5:
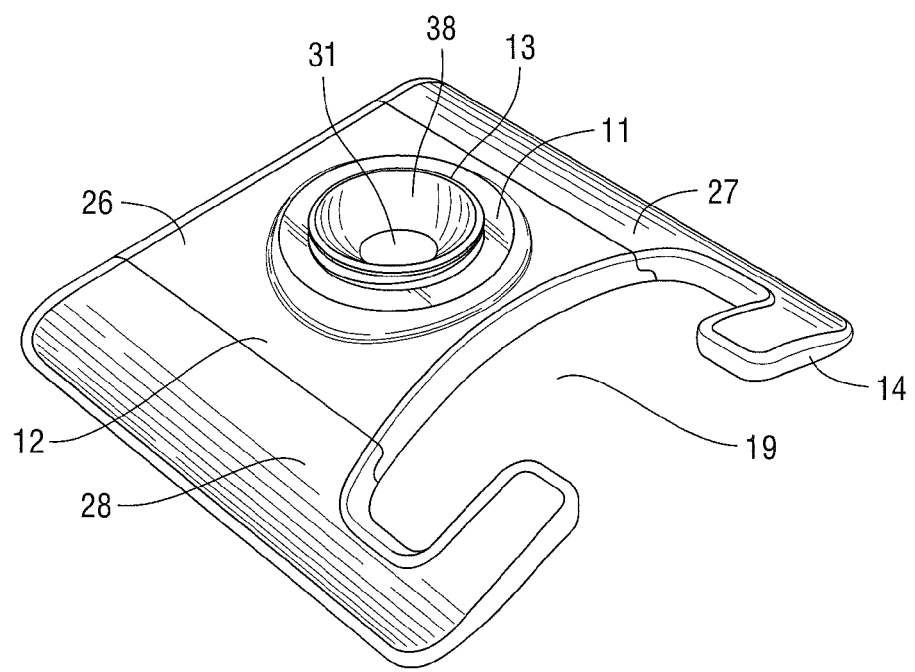
FIG. 5 is a perspective view of a preferred embodiment of the base of the stand or support of FIG. 1.

FIG. 5 illustrates stand 10 without retainer ring 24, ball shaft support 22, support shaft 15 and support plate 16 to clearly show annular shoulder 11, cylindrical column 13, central aperture 31 and socket 38 defined by base 12.

Figure 6:
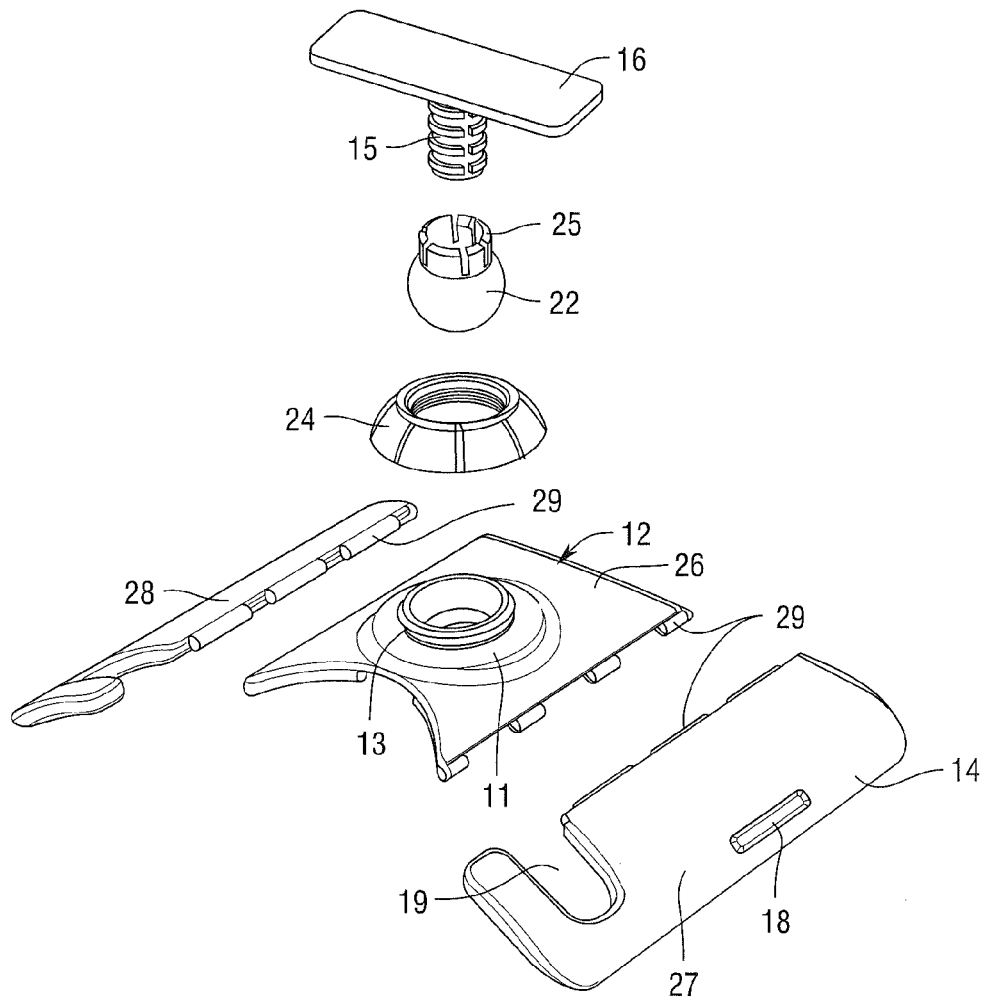
FIG. 6 is an exploded, perspective view of the stand or support of FIG. 1.

FIG. 6 provides an exploded, perspective view of stand 10 including base 12 and its three sections, the central body 26 and side members 27 and 28 hingedly connected to central body 26 by hinges 29. Here, retainer ring 24 is shown disposed below ball shaft support 22, but the diameter of the opening in retainer ring 24 is preferably smaller than the diameter of the ball portion of ball shaft support 22 which must necessarily be inserted into socket 38 prior to retainer ring 24 being screwed onto cylindrical column 13.

Figure 7:
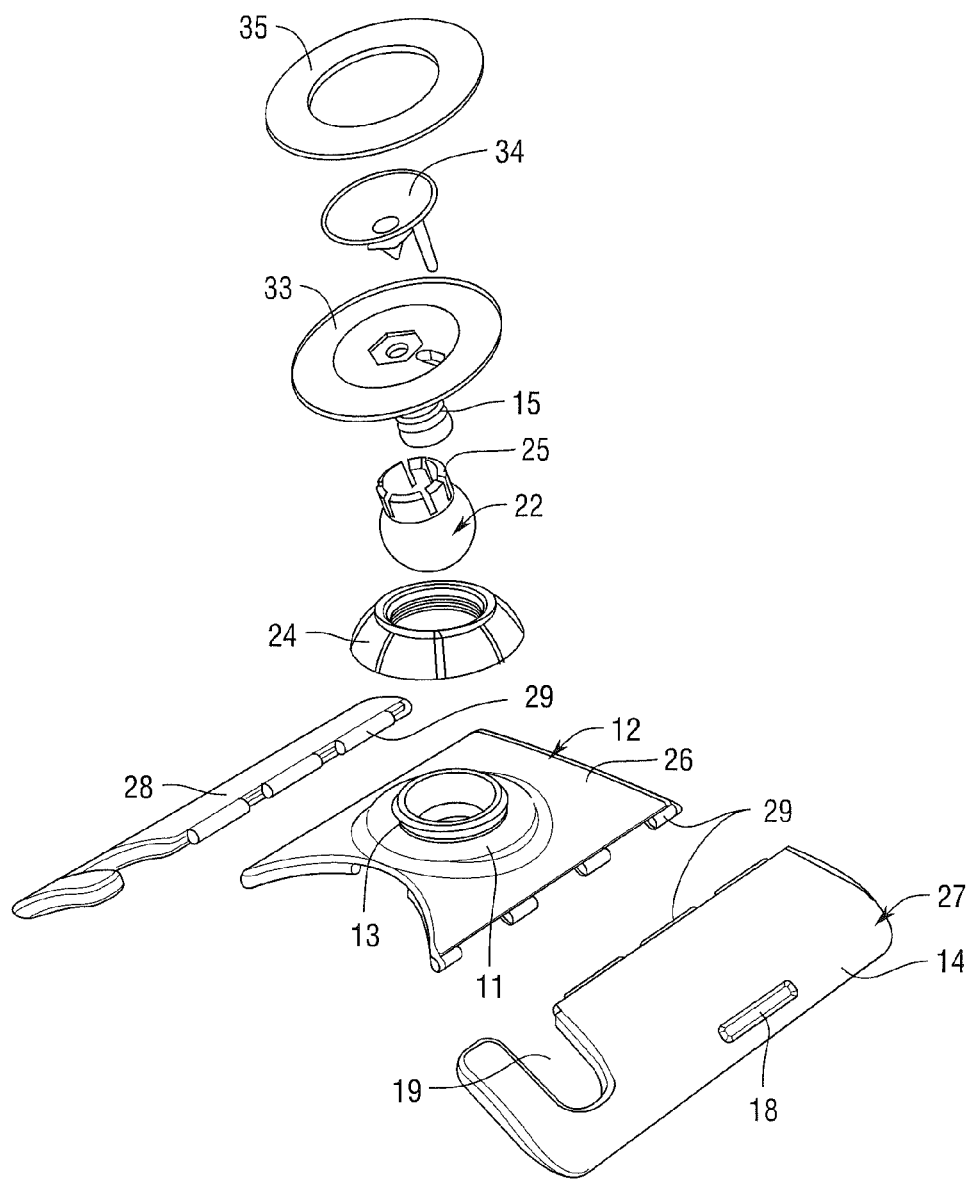
FIG. 7 is an exploded view of a stand or support for a planar or tablet computing device according to another preferred embodiment of the present invention.

FIG. 7 shows an exploded, perspective view of another preferred embodiment of stand 10 of the present invention wherein support shaft supports and is removably connected to connector plate 33 having a suction cup 34 and a Velcro (hook and loop) fastening ring 35 disposed thereon. The complementary component of the Velcro ring preferably would be attached to the computing device 20 to be removably attached to this embodiment of stand 10 via connector plate 33 and suction cup 34. In this way, both the suction cup 34 and Velcro ring 34 would act as part of the means for removably securing computing device 20 to connector plate 33 and thus also to stand 10.

Figure 8:
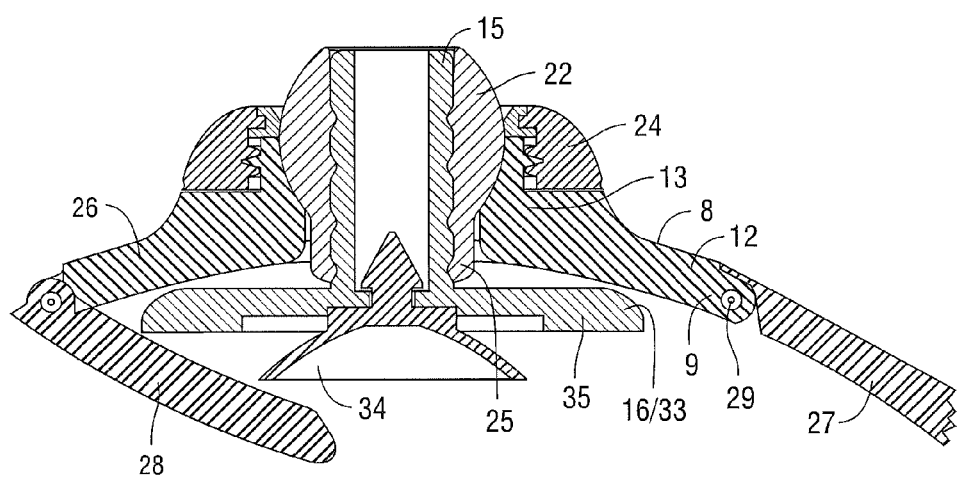
FIG. 8 is a partial, cross-sectional view of the stand or support of FIG. 7 partially folded for stowage.

FIG. 8 illustrates in a partial, cross-sectional view of the stand 10 of FIG. 7 partially folded for stowage with side member 28 partially folded under central body 26. Also shown is how ball shaft support 22 is inverted in socket 38 in the stowage configuration of stand 10, with connector plate 33 and suction cup 34 disposed adjacent to the concave underside 9 of base 12. Retainer ring 24 has been tightened onto cylindrical body 13 to bring connector plate 33 as close as possible to the concave underside 9 of base 12.

FIG. 9 comprises a series of elevational views of a preferred embodiment of a support plate 40 having a dual-sided support pad 46 having a non-slip side 47 and a hi-tack or adhesive side 49 (shown in FIG. 10A) for use with the stand 10 of the present invention. Additionally, the support plate 40 comprises an articulating clip or clasp 42 and a fixed catch 44 for removably securing dual-sided pad 46 or dual-sided pad 50 (FIG. 10B) to support plate 40 and thus to stand 10.

FIG. 10B shows a cross-sectional view another preferred embodiment of a dual-sided support pad 50 having a non-slip side 54 and a hi-tack or adhesive side 53 and an embedded magnet 52 for use with a stand 10 wherein the magnet 52 provides additional attraction forces to keep a computing device 20 having a ferromagnetic case or outer shell removably attached to support plate 16 or 40 of the stand 10 of the present invention.

FIG. 11 illustrates a perspective view of a preferred embodiment of a harness 56 useful as part of a means for removably attaching a planar or tablet computing device 20 to a stand 10 of the present invention.

FIG. 12 shows a perspective view of a preferred embodiment of a bracket 58 useful as part of a means for removably attaching a planar or tablet computing device 20 to a stand 10 of the present invention.

FIG. 13 illustrates perspective view of another preferred embodiment of a bracket 60 useful as part of a means for removably attaching a planar or tablet computing device 20 to a stand 10 of the present invention.

FIG. 14 shows a perspective view of another preferred embodiment of a harness or bracket 62 useful as part of a means for removably attaching a planar or tablet computing device 20 to a stand 10 of the present invention.

FIG. 15 displays a perspective view of a preferred embodiment of a cover 64 with an aperture 65 useful as part of a means for removably attaching a planar or tablet computing device 20 to a stand 10 of the present invention.

FIG. 16 shows a front perspective view of a preferred embodiment of a cover or bracket 66 with a support shaft 68 useful as part of a means for removably attaching a planar or tablet computing device 20 to a stand 10 of the present invention. FIG. 17 illustrates a rear perspective view of the cover or bracket 66 with a support shaft 68.

FIG. 18 shows a perspective view of another preferred embodiment of a cover or bracket 70 useful as part of a means for removably attaching a planar or tablet computing device 20 to a stand 10 of the present invention.

Figure 19:
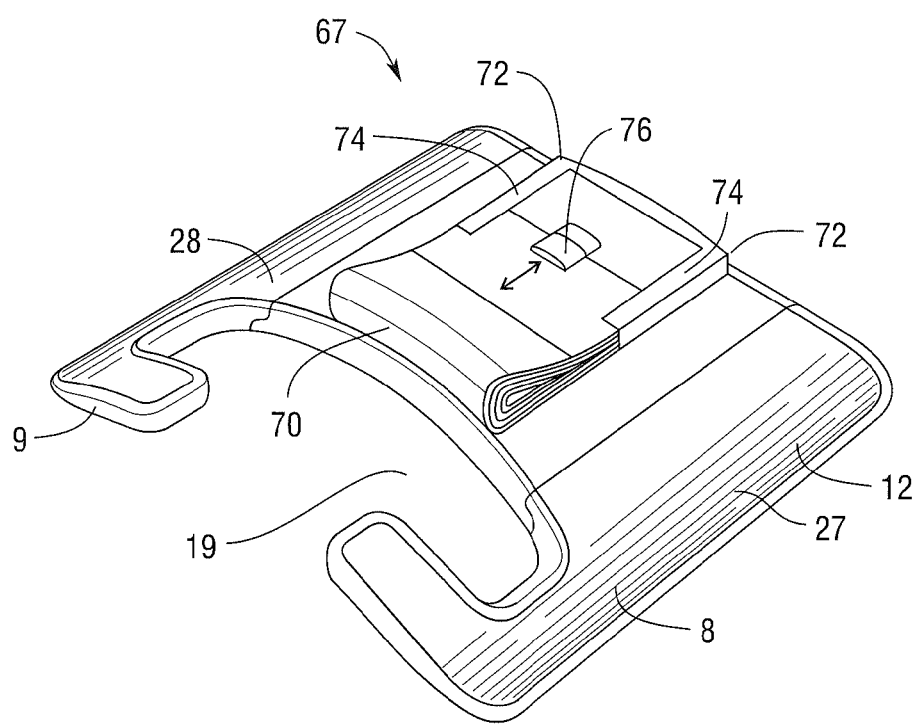
FIG. 19 is a perspective view of a stand or support for a planar or tablet computing device according to another preferred embodiment of the present invention.

FIG. 19 shows a perspective view of a stand or support 67 for a planar or tablet computing device according to another preferred embodiment of the present invention comprising a base 12 having a non-slip ridge 70 and a protrusion 76 for sliding non-slip ridge 70 to different positions in channels 74. Base 12 defines slot 19 and may be comprise joints 72 such that left side member 28 and/or right side member 27 may be folded under base 12 for stowage. Base 12 may also comprise a singe joint only for folding base 12 upon itself for stowage as well. Again, base 12 preferably has a convex upper surface 8 and a concave underside 9. In this preferred embodiment, a computing device (not shown) could be supported in slot 19 and rest against non-slip ridge 70 either vertically (90°) or at various angles from vertical depending upon where non-slip ridge 70 is positioned along channels 74.

In the foregoing Detailed Description, various features are grouped together in a single embodiment to streamline the disclosure. This method of disclosure is not to be interpreted as reflecting an intention that the claimed embodiments of the invention require more features than are expressly recited in each claim. Rather, as the following claims reflect, inventive subject matter lies in less than all features of a single disclosed embodiment. Thus, the following claims are hereby incorporated into the Detailed Description, with each claim standing on its own as a separate embodiment.

The invention claimed is:

1. A support for a planar or tablet computing device, comprising:
   an arcuate base having a convex upper surface and a concave underside and comprising a central body and first and second side members, wherein the central body defines a socket and each of the first and second side members articulates with the central body, wherein each of the first and second side members may be folded underneath the central body, wherein a slot in the base is defined by the central body and first and second side members for receiving a side of the planar or tablet computing device for supporting the same in a vertical position or at angle with respect to vertical;
   a ball-shaped shaft support removably and rotatably disposed within the socket;
   a support shaft removably secured to the ball-shaped shaft support; and
   a support plate attached to the support shaft, wherein the support plate may be disposed at variable positions to provide additional support to the planar or tablet computing device when a side thereof is disposed in the slot, the support plate providing an alternate mounting for the planar or tablet computing device wherein an underside of the computing device may be placed upon an upper surface of the support plate in a functional position for use by a user.

2. The support for a planar or tablet computing device of claim 1 wherein the underside of the base or a perimeter of the base comprises a non-slip material, an adhesive material or a temporary fixation material.

3. The support for a planar or tablet computing device of claim 1 further comprising means for removably attaching the base to a limb of a user or other generally cylindrical object.

4. The support for a planar or tablet computing device of claim 1 wherein the ball-shaped shaft support is removably retained within the socket by a threaded retainer ring that can be tightened onto a cylindrical column defined by the base; wherein the cylindrical column defines the socket and has a threaded outer surface on which the threaded retainer ring may be removably secured.

5. The support for a planar or tablet computing device of claim 4 wherein the retainer ring may be tightened onto the cylindrical column to varying degrees to allow for rotational movement of the ball-shaped shaft support within the socket and also for temporary immobilization of the ball-shaped shaft support within the socket.

6. The support for a planar or tablet computing device of claim 1 wherein the upper surface of the support plate comprises a non-slip material.

7. The support for a planar or tablet computing device of claim 1 wherein the upper surface of the support plate comprises a tacky material.

8. The support for a planar or tablet computing device of claim 7 further comprising a non-slip cover for covering the tacky upper surface.

9. The support for a planar or tablet computing device of claim 1 wherein the upper surface of the support plate comprises an adhesive material, a tacky material or a temporary fixation material.

10. The support for a planar or tablet computing device of claim 1 wherein the upper surface of the support plate comprises a polyurethane material.

11. The support for a planar or tablet computing device of claim 1 wherein the upper surface of the support plate comprises a thermoplastic elastomer, a silicone, a rubber, an acrylic, an acrylic foam or an acrylic adhesive.

12. The support for a planar or tablet computing device of claim 1 further comprising a suction cup disposed on the support plate; wherein the suction cup is used for removably attaching the planar or tablet computing device to the support plate.

13. The support for a planar or tablet computing device of claim 1 further comprising a hook and loop fastener for removably fastening the planar or tablet computing device to the support plate.

14. The support for a planar or tablet computing device of claim 1 wherein the support shaft comprises external threading and the ball-shaped shaft support comprises a generally spherical body and a cylindrical neck portion having a threaded bore for receiving the support shaft.

15. The support for a planar or tablet computing device of claim 1 wherein the slot has an open top, an open bottom and one open side.

16. The support for a planar or tablet computing device of claim 1 further comprising: means for removably attaching the planar or tablet computing device to the support plate.

17. A method for supporting a planar or tablet computing device, comprising:
- providing a stand or support for a planar or tablet computing device, comprising an arcuate base having a convex upper surface and a concave underside and comprising a central body and first and second side members, wherein the central body defines a socket and each of the first and second side members articulates with the central body, wherein each of the first and second side members may be folded underneath the central body, wherein a slot in the base is defined by the central body and first and second side members for receiving a side of the planar or tablet computing device for supporting the same in a vertical position or at angle with respect to vertical; a ball-shaped shaft support removably disposed within the socket, a support shaft attached to the ball-shaped shaft support; and a support plate attached to the support shaft; wherein the ball-shaped shaft support is removably retained within the socket by a threaded retainer ring that can be tightened onto a cylindrical column defined by the base; and wherein the retainer ring may be tightened onto the cylindrical column to varying degrees to allow for rotational movement of the ball-shaped shaft support within the socket and also for temporary immobilization of the ball-shaped shaft support within the socket;
- mounting the planar or tablet computing device by inserting a side of the planar or tablet computing device into the slot and adjusting the position of the support plate to contact the planar or tablet computing device disposed in the slot, the support plate providing an alternate mounting for the planar or tablet computing device wherein an underside of the computing device may be placed upon an upper surface of the support plate in a functional position for use by a user.

* * * * *